Feb. 22, 1966  H. C. HAFFERKAMP ETAL  3,236,116

GENEVA-TYPE TRANSMISSION

Filed Sept. 14, 1961

INVENTOR.
HARRY C. HAFFERKAMP
ROBERT A. KURTZ
BY J. R. Nelson and
W. A. Schaich
ATTORNEYS

United States Patent Office 3,236,116
Patented Feb. 22, 1966

3,236,116
GENEVA-TYPE TRANSMISSION
Harry C. Hafferkamp and Robert A. Kurtz, Toledo, Ohio, assignors to Owens-Illinois Glass Company, a corporation of Ohio
Filed Sept. 14, 1961, Ser. No. 138,009
9 Claims. (Cl. 74—436)

The present invention relates to transmission of rotary motion imparted by a continuously operated prime mover to a machine element wherein the machine element is indexed in step-by-step movement, and more particularly, to transmission of such indexing movement to a machine element at high rates of indexing cycles, yet with a minimum of vibration and shock.

The general type of transmission, known as a Geneva drive, has been utilized widely to index relatively heavy machinery elements, such as a turret or the like, through a predetermined number of radial stations. This drive unit utilizes a slotted driven member, known as a Geneva wheel, and a drive arm that carries a drive pin, known as a Geneva pin. The arm and pin are mounted on an input shaft that is rotated by a drive connection with the prime mover, such as a motor. The motor is operated for continuously driving the input shaft. For every revolution of the input shaft, the Geneva pin enters a slot on the Geneva wheel and indexes the latter a predetermined amount and leaves the slot. As the Geneva pin leaves the slot, a contoured member driven by the driver is fitted into a correspondingly contoured part of the Geneva wheel to lock the latter into position until the next index cycle is to begin. The driven member thus transmits through its output shaft a given number of degrees of rotary drive motion to the machinery element for each rotation of the input shaft. During each index portion of movement, the Generva wheel starts from rest, accelerates to a peak velocity and then decelerates to rest. Some machinery elements of considerable mass, such as is illustrated herein, must be indexed at relatively high rates. However, due to shock and vibration inherent in the conventional Geneva drive there is a limit to the speed at which this type transmission will operate satisfactorily.

In mechanics, it is axiomatic that any moving body, such as the drive pin on the rotary Geneva arm, will maintain its linear velocity without change unless acted upon by some external force. Any accelerations produced in that body will be directly proportional to and in the same direction as the force applied. This force may change linear velocity or direction of motion or both. For instance, in the case of a Geneva drive pin rotating about a fixed center at a constant angular velocity, there is a constant radial force producing a constant radial acceleration which causes a continually changing direction of motion without any change in the actual magnitude of linear velocity. Hence, at the instant the drive pin, which is rotating in a true circle, engages in the slot of the Geneva wheel, this radial force which keeps the drive pin moving in a circle is suddenly applied through the pin to one side of the slot that it engages, and this produces a shock, despite the fact that at the instant of engagement, the pin is moving parallel to the sides of the slot. At relatively low speeds this is not detrimental, but as speeds increase it becomes so. The failure of these drives at high speed is caused by excessive shock or "jerk."

It is therefore an object of the present invention to provide an improved Geneva drive which reduces to a minimum vibration and "jerk" to effectively produce indexing at higher speeds and yet lengthen machine life as well as the life of the drive unit; yet, which will be operable in either direction of rotation.

A further object of the invention is to provide an improvd Geneva drive that will enable increased production of machine equipment which is operates; yet, will require a minimum of revision of the equipment or an existing standard Geneva drive unit and be economical and simple to maintain and operate.

In a more distinct sense, the invention has been realized from a complete analysis of the conventional Geneva drive mechanism. This analysis indicated theoretically, at least, that instantaneous changes in acceleration of the driven member of the mechanism at the beginning and at the end of the indexing stroke will produce shock or "jerk" at high speed operation in moving machine elements of substantial mass.

In terms of dynamics, "jerk" is defined as the rate of change of acceleration and may, therefore, be measured by the slope of the acceleration curve plotting acceleration of the driver with respect to the axis of the Geneva wheel slot. In other words, jerk is the third derivative of displacement. Acceleration changes which are infinite, or where the slope of the acceleration curves are infinite, will produce infinite quantities of jerk or shock. This is graphically demonstrated herein by the drawings, to be presently described, which show displacement, velocity and acceleration curves plotted from the angle $\phi$ which is generated by the drive pin as it travels through one revolution. Angle $\phi$ is measured between a line through the center of the drive pin and the axis of rotation of the Geneva wheel and a line through the axis of rotation of the drive arm carrying the drive pin and said axis of the Geneva wheel. In these curves, the displacements, velocities and accelerations of the Geneva wheel will be the same as shown during the index period, but otherwise are zero for the remainder of the revolution of the drive pin. The curves for the drive pin of a standard Geneva mechanism are the dash line curves G on FIGS. 6–8. The curves for the drive pin of the improved mechanism of this invention are the solid line curves M on FIGS. 6–8. The rate of change of acceleration on the curve M on FIG. 8 is a finite quantity essentially at all times. Comparison of the acceleration curves on FIG. 8 demonstrates two key relationships, these being at the time the driver enters and leaves that slot. The curve G indicates that the relative acceleration of the drive pin with respect to the radial center of the slot (that is transversely in the slot) at the time of engagement of the drive pin and the slot is a positive quantity, .01 degre of the driven (equated to angle $\phi$) per degree per degree of the drive pin. The curve M indicates that this relative acceleration at this same instant is zero. Similarly, the relative acceleration of the drive pin with respect to the radial center of the slot as the driver leaves the slot in the standard Geneva drive (curve G) is a negative .01 degree of the driven (equated to angle $\phi$) per degree per degree of the drive pin. In the present invention (curve M), this relative acceleration at the same instant is zero. The acceleration curve G for the drive pin appears as an increasing quantity at the times the drive pin engages and disengages the Geneva slot, yet the Geneva wheel at these times is instantaneously accelerating from or decelerating to zero. Thus, at the times of engagement or disengagement of the drive pin and Geneva slot there is an infinite amount of jerk. The amount of jerk present in the use of the present invention, by contrast, is minimized.

The invention has, therefore, a distinct object of providing a modification to the motion of the drive pin off the mechanism to eliminate these instantaneous changes in acceleration, and thereby limit "jerk;" hence, permit higher speeds of operation with attendant satisfactory operating conditions.

In the present invention, the first requirement realized is that the linear velocity of the drive pin at the instant of engagement with the slot of the Geneva wheel is parallel to the center-line of the engaged slot. The second requirement of this invention is that any acceleration of the drive pin at the instant of engagement with the Geneva wheel in a slot has to be parallel to the center-line of that slot. Any such acceleration of the drive pin parallel to the slot will have no resultant acceleration on the Geneva wheel, since it is radial with respect to the latter. This means, of course, that the drive pin cannot be restrained to a fixed distance from the axis of the input drive shaft.

The conventional Geneva drive has its drive pin fastened rigidly on a radial arm that is rotated by the input shaft. Thus, the drive pin is at a fixed distance from the center of rotation of the input shaft. The foregoing object of this invention is accomplished, accordingly, by placing the drive pin in a slide on the radial arm, the slide being arranged radially with respect to the input shaft and the drive pin being controlled to be moved radially with respect to the center of rotation of the shaft during the rotary movement of the drive pin while approaching and during the indexing period by means of a specially contoured stationary cam. The Geneva wheel may be designed for three or more stations, that is, three or more radial index slots.

Figure 3:
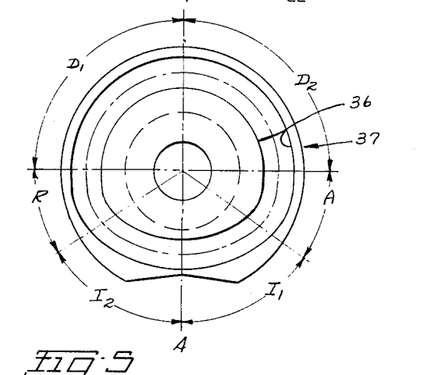
FIG. 3 is a sectional plan view of the mechanism shown on FIG. 2, and illustrates the control cam which prescribes the planned path (shown by the arrows) for the driver of the unit.
Figure 4:
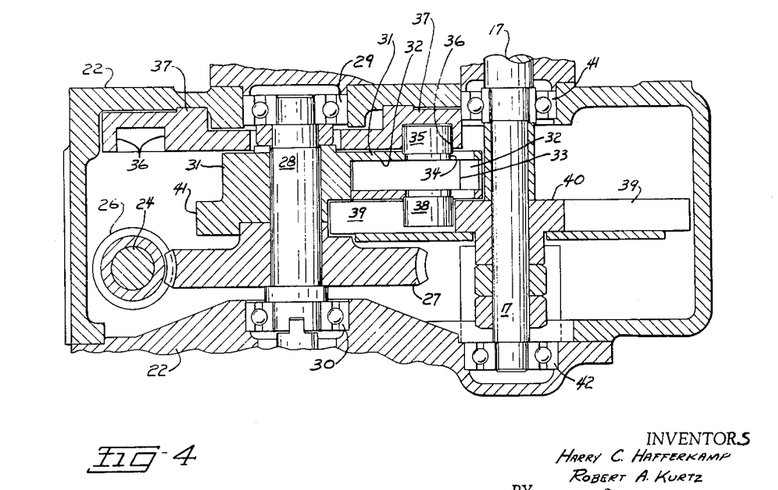
FIG. 4 is a sectional elevational view taken along lines 4—4 of FIG. 3.

By way of example, the standard four-slot Geneva mechanism requires that the indexing period of the driven Geneva wheel be achieved during 90° of rotation of the driver when the latter is engaged in a slot. The four-slot Geneva wheel of the present invention, as is illustrated herein enables indexing, for example, by a 112° movement of the drive (angle $\beta$ on FIG. 3) to obtain a 90° Geneva wheel index (angle $\alpha$ on FIG. 3). The remaining 248° of rotation of the driver prior to the next index is planned so that the driver will smoothly leave the Geneva slot and travel on its way to the next slot engagement to make ready for a similar smooth engagement. The radial movement of the driver during its rotation to the point of engagement with the Geneva slot is just as important as the planned movement while it is engaged with the Geneva wheel. This planned path for the driver will bring it into the Geneva slot such that it will arrive at the point of engagement with the slot so that there will be zero acceleration existing between the driver and the slot. After the instant of engagement of the two parts, the acceleration of the drive pin is progressed to produce a finite rate of change of angular acceleration of the Geneva wheel. This has proven both in theory and in practice to reduce shock or jerk on the mechanism and the machinery element being driven. It consequently has enabled a startling increase in the production capacity of the unit. For example, on the turret mechanism illustrated herein, the conventional Geneva drive transmission was limited to a production rate of 60–80 indexes per minute of the turret. In operation, the present invention has enabled increasing that indexing rate with ease into the range of 140–175 indexes per minute. Thus, on a given machinery unit, the invention has enabled better than double the production by the use of the principles herein disclosed.

It should be pointed out that the use of the mechanism of the invention obtained still another benefit as an unexpected by-product. For example, it is possible to use a four-station Geneva wheel as the driven member but there is no longer a restriction of a 90° indexing period of the driving member (drive pin). Investigations revealed that even at higher speeds, there is some time available during the dwell period that could be used for indexing. The mechanical limitations of the housing for the drive mechanism may impose certain restrictions, but its is practical in the particular transmission unit illustrated for the example herein described to obtain an indexing period of 112° for the drive pin, which heretofore had been restricted to 90°. This is an extension of 24% of the indexing time per cycle. This additionally permits a comparable increase in speed, over and above that permitted by the elimination of shock.

Another object of this invention is, therefore, to provide wherever practical or desired a longer period of index, in terms of degrees of rotation of the driver, so as to devote as large a part of the complete revolution cycle of the driver as is possible to the indexing period.

The specific nature of this invention, as well as other objects and advantages thereof, will become apparent to those skilled in the art from the following detailed description, taken in conjunction with the annexed sheets of drawings, on which, by way of preferred example only, is illustrated a preferred embodiment of this invention.

In the drawings:

FIG. 6 is a graph showing a comparison between the conventional Geneva drive and the present invention, plotting displacement in degrees of the angle $\phi$ during one revolution of the drive arm;

FIG. 8 is a similar graph plotting acceleration in degrees of the angle $\phi$ per degree per degree of the drive pin during one revolution of the drive arm.

As a general description of the invention, the drive pin is mounted on a radial slide in the rotating driving member. The distance from the drive shaft to the drive pin is controlled at all times by a stationary cam encircling the drive shaft. Through this simple device, motion can be made to conform to any desired pattern within physical limitations of the mechanism. As the one form of motion herein described, the drive pin is controlled by what is known as a "modified trapezoidal acceleration." This form of motion has the desirable characteristics for the requirements of the present invention by providing: (1) a continuous acceleration curve; (2) zero acceleration of the driver with respect to the slot of the driven member at the beginning and end of the indexing period which means a smooth transmission of the driven member during index from at rest to a return to rest; (3) a magnitude of velocity of the Geneva wheel at the middle of the indexing stroke that is considerably less than in a standard Geneva drive; (4) maximum acceleration that is less than that of the standard Geneva drive; (5) an indexing period of the driver that is increased in each cycle to reduce peak accelerations and velocities, in other words, the index period of the cycle (angle $\beta$) is lengthened and the driven member is indexed more smoothly.

The next approach is to plan the cycle of the driver by planning the motion of the drive pin approaching the indexing period and leaving the indexing period (the periods herein indicated as A and R) so that there is continuity in its acceleration curve at the instant of engagement of the driver in the slot of the driven member and at the instant of disengagement thereof.

Referring now to the drawings, the apparatus, as herein shown and described, is particularly adopted for operating a turret-type device for handling bottles or jars 10, but the invention is not limited to such use.

Figure 1:
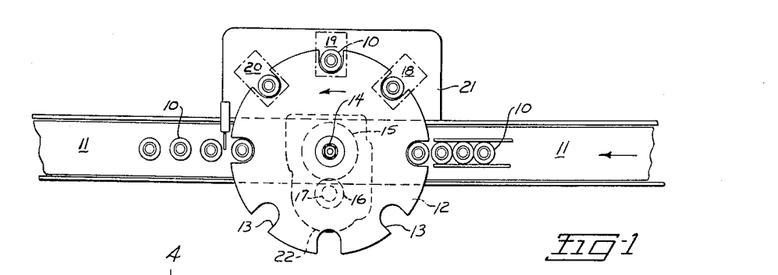
FIG. 1 is a plan view of a turret indexing type of machine on which the invention is employed.
Figure 2:
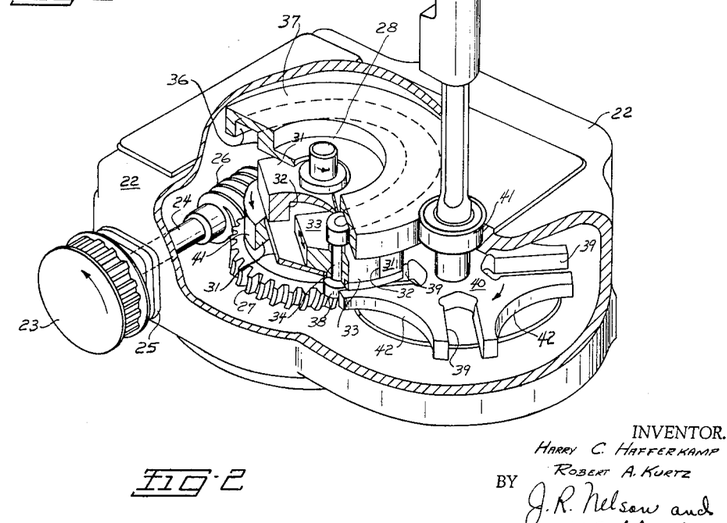
FIG. 2 is a perspective view, partly broken away, showing the novel mechanism of the invention.

In general terms, the apparatus comprises a conveyor 11, to which the articles 10 are delivered. The conveyor may be driven continuously, and carries the articles to a turret 12 which is provided with receiver slots 13 at equal intervals around its periphery. The turret 12 is mounted on a vertical shaft 14 that is drivably connected with a gear 15 in mesh with a pinion 16. The gear 15 and pinion 16 comprise a geared speed reduction chain of a preselected ratio. The pinion 16 is keyed onto the output shaft 17 of the improved transmission drive unit of the present invention, which supplies a step-by-step indexing movement of turret 12. The turret 12 is intermittently rotated step-by-step for bringing each slot 13 to stations numbered 18, 19 and 20, indicated in phantom outline, at which gauging and inspecting units are mounted in stationary location on the frame 21 of the machinery.

As shown in more detail on FIGS. 2–5, the improved Geneva-type drive transmission is attached at the underside of conveyor 11 by attaching the housing 22 to the frame 21 in any suitable manner. Power is applied to the transmission at sprocket 23 that is keyed on bearing-mounted shaft 24 extending into housing 22 at bearing 25. The sprocket 23 is connected with a continuously operating drive motor through a belt or chain (not shown). A worm gear 26 is keyed on shaft 24 and meshes with pinion teeth of the driving gear 27. This driving gear is drivingly connected on the lower part of the vertical shaft 28 that is mounted for rotation in the end bearings 29 and 30 in housing 22. Connected integral with the gear 27 and keyed on shaft 28 is a driver hub 31. The hub 31 extends as an arm from the shaft 28 and is formed with a slideway 32 that extends in a radial direction along that arm from the axis of rotation, or the center of shaft 28. A radial slide 33 is mounted in the slideway 32 and has a vertical drive pin shaft 34 that extends above and below the hub arm 31. At the top side of the pin shaft 34 is a freely rotatable cam roller or cam follower 35. This roller 35 fits in a contoured track or cam surface 36 of a stationary cam member 37. Cam member 37 is rigidly fastened to the housing 22 of the transmission. The characteristics of the contoured surface 36 of the cam member will be presently discussed in detail. This cam provides a predetermined path for the roller 35 to follow endlessly and continuously encircling shaft 28. Cam 36 will shift side 33 radially in slideway 32 of the hub 31 as the latter rotates around the axis of shaft 28, and the radial shifting of the driver pin 38 enables performing the index displacement, angle $\alpha$, of Geneva wheel 40 through the larger angular displacement, angle $\beta$, of the driver 38 (see FIG. 3) to obtain the objectives pointed out herein.

At the lower end of drive pin shaft 34 is a freely rotatable drive pin or roller 38 which is of a diameter suitable for the roller to enter an elongated slot 39 of slotted 4-station Geneva wheel 40. It is roller 38 that engages Geneva wheel 40 at one of its slots 39 to index the wheel 40 a prescribed amount each revolution of shaft 28. Accordingly, Geneva wheel 40 is keyed on the output shaft 17 which is, as already mentioned, connected to drive the turret 12 of the machinery. Shaft 17 is mounted in bearings 41 and 42 in housing 22 and is parallel to the shaft 28 in the housing. The axes of rotation of shafts 17 and 28 are, as stated, parallel with each other and, likewise, the axis of shaft 34 or center of rotation of pin 35 is parallel with the axes of shafts 17 and 28. Thus, as the driver arm 31 is constantly rotated about the axis of shaft 28, the drive pin 38 and cam roller 35 both move through an angle $\phi$ with respect to the axis of shaft 17. This angle $\phi$ (FIGS. 2 and 3) is measured at any instant of the rotation of the drive pin 38, measured as the angle $\theta$, by a line connecting the axes of shafts 17 and 28 and a line connecting the axes of shaft 17 and pin shaft 34, the latter being the axis of rotation of both roller 35 and drive pin 38. The side opposite the angle $\phi$ defines the distance between the axis of shaft 28 and the center of roller 35, and this distance is varied under control of the cam faces 36. This angle $\phi$ forms the basis for plotting the curves shown on FIGS. 6–8 and, for the indexing period only, is the same angle through which the Geneva wheel is being driven. Therefore, for the indexing period, the curves represent the true rotary motion of the Geneva wheal, as well as the motion of the drive pin 38. For the remaining part of the cycle, of course, the Geneva wheel is at rest since the drive pin 38 is disengaged from the slot. For this latter period the curves represent only the motion of the drive pin. This method of representing motion is necessary to insure a shock free transition from the dwell period to the indexing period.

The back face of hub 31 is formed on a radius to shape a peripheral arcuate male contour 41 (FIG. 2) disposed opposite slide 33 and slideway 32. The Geneva wheel 40 is correspondingly constructed on its periphery intermediate the slots 39 at the arcuate female contours 42. The contours 41 and 42 match so that, during rotation of the hub 31, the male contour 41 thereon will be brought to fit with the female contour 42 on the Geneva wheel in the interval between indexes of the latter and during the time in which the driver 38 is out of engagement with a slot 39. This provides the usual lock device for holding wheel 40 stationary between its successive indexes.

In the drive connections described the sprocket 23, worm gear 26 and pinion 37 provides an initial speed reduction unit to obtain the desired gear ratio for rotation of the input shaft 28 for the particular drive motor (not shown) selected for use. Also, as is illustrated on the drawings, the 4-station Geneva wheel 40 is selected as a complement to the turrent 12 (FIG. 1) which is constructed with eight equally spaced slots 13 for receiving the articles 10. Accordingly, a 2:1 gear ratio between gears 15 and 16 is employed to supply eight equal increments of index of the turrent. It should be understood however, that a Geneva wheel of any number of stations may be employed and the turrent 12 constructed accordingly, along with the appropriate gear ratios, to obtain the desired number of intermittent indexes of the machinery.

The important element, for the purposes of the invention, is the cam 37 and its profile in prescribing the path for roller 35 and drive pin 38 in radially shifting the drive pin along the radius of the drive member 31 by the slidewbay therein and the cooperating slide 33.

For sake of illustration and for purposes of simplifying explanation of the cam path 36, the analysis of the motion of the drive pin with respect to the Geneva wheel is plotted from the angle $\phi$ which is generated by the drive pin. This angle $\phi$ is defined from the center of the drive pin to the axis of the Geneva wheel and from that axis of the Geneva wheel to the axis of the drive member 31. Angle $\phi$, therefore, varies between 0° and plus and minus maximums during a complete revolution of the driver. This permits an analysis in terms of the angular position of the drive pin with respect to the driven member for the full cycle of the driver. This relationship is used in developing the graphs of displacement, velocity and acceleration on FIGS. 6–8. The span for the curves M on the graphs, indicated as $D_1+D_2$, represent the 180° segment of the rotation of the drive member 31 opposite the indexing period. This is the "dwell" period whereat, actually, the driver 38 and Geneva wheel slot 39 are out of engagement. The indexing period for the curves M is indicated by the span $I_1+I_2$ on the graphs which is the angle $\beta$ on FIG. 3. In the example illustrated, this amounts to a 112° segment of rotation of the drive member 31.

This example in the span of angle $\beta$ on FIG. 8 describes a modified trapezoidal acceleration curve which has a characteristic of contour where $\theta_1=\theta_3=\beta/8$; and $\theta_7+\theta_3=\theta_2$. In this pattern of acceleration both the drive pin and Geneva wheel are subject to the same movement during the indexing period and, therefore, the cam controls the drive pin so that at the beginning of the indexing period the relative acceleration of the Geneva wheel and drive pin is zero. Thereafter the acceleration of the two increases to a maximum during the first one-eighth of the indexing period or during $\theta_1$. This is followed by a constant acceleration over the next one-fourth of the indexing period or during $\theta_2$, and then deceleration during $\theta_3$ to zero and to a maximum deceleration which spans the next one-fourth of the indexing period. This is followed by a constant deceleration over the next one-fourth of the indexing period. Finally, zero acceleration is restored at the end of the indexing period by a decreasing deceleration in the last one-eighth of the indexing period. There is then remaining in a complete revolution of the drive member, a segment of 68° which has been divided equally. The segment indicated as A for the curves M is the approaching period when the driver is moving into position to engage the slot of the Geneva wheel. The segment indicated as R for the curves M is the recession period as the driver moves out of engagement and away from the slot of the Geneva wheel. In the spans A and R on FIG. 8, the acceleration curve for the motion of the drive pin before and after indexing engagement with a slot of the Geneva wheel varies in accordance with moving the drive pin radially of its center of rotation so that it enters and leaves the slot in a direction parallel with the radial axis of that slot. Also, the relative velocity and acceleration of the drive pin with respect to the slot is adjusted to zero at the time the drive pin engages the slot to begin the indexing period and at the time the drive pin disengages the slot at the end of the indexing period.

By moving the drive pin with respect to the Geneva wheel slot so that the indexing period is begun and ended with zero velocity and acceleration, and by indexing the wheel with a finite rate of change of acceleration, reduces jerk to a minimum. The form of the acceleration herein disclosed comprises one form of motion for accomplishing this objective.

Figure 7:
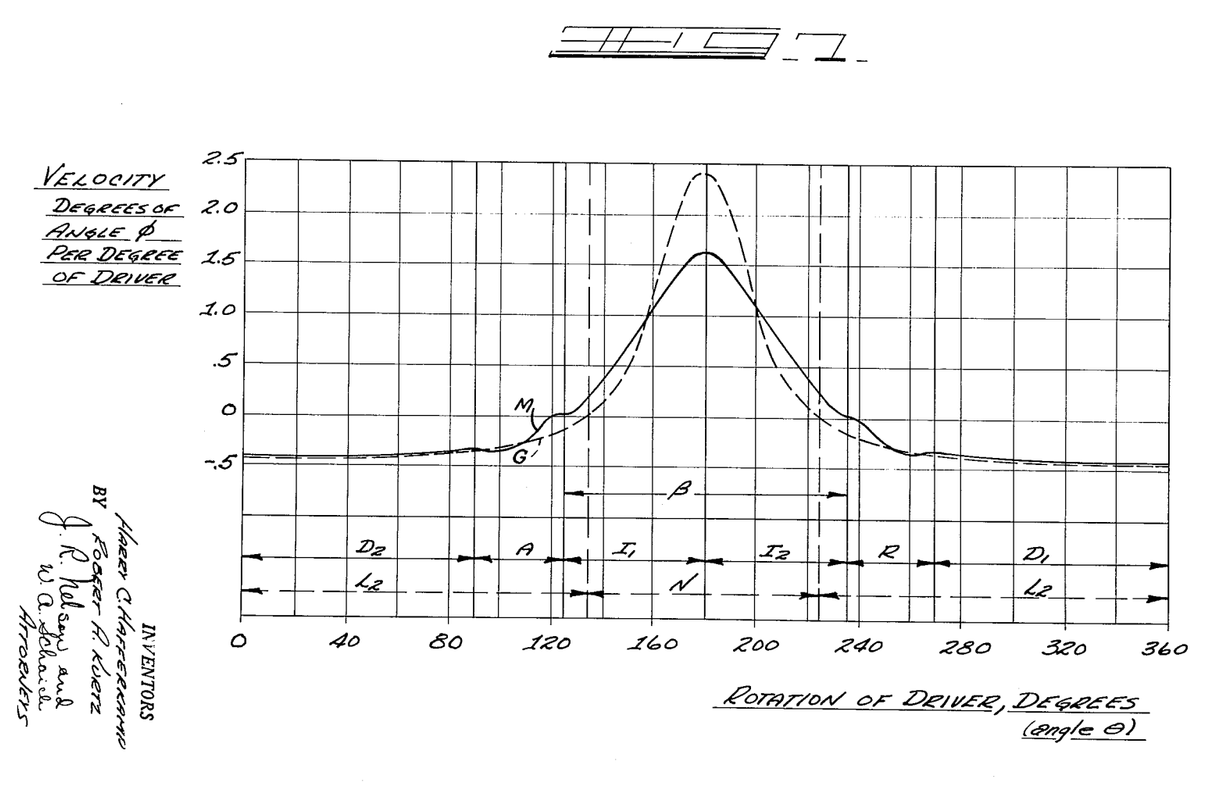
FIG. 7 is a similar graph plotting velocity in degrees of the angle $\phi$ per degree of the drive pin during one revolution of the drive arm.

The contour of the cam is then calculated to provide the displacement, velocity and acceleration characteristics of the driver with respect to the radial center of the Geneva wheel slot 39 in accordance with the curves M on FIGS. 6–8. The cam contour along parallel cam groove surfaces 36 is calculated mathematically on the basis of these curves.

Figure 5:
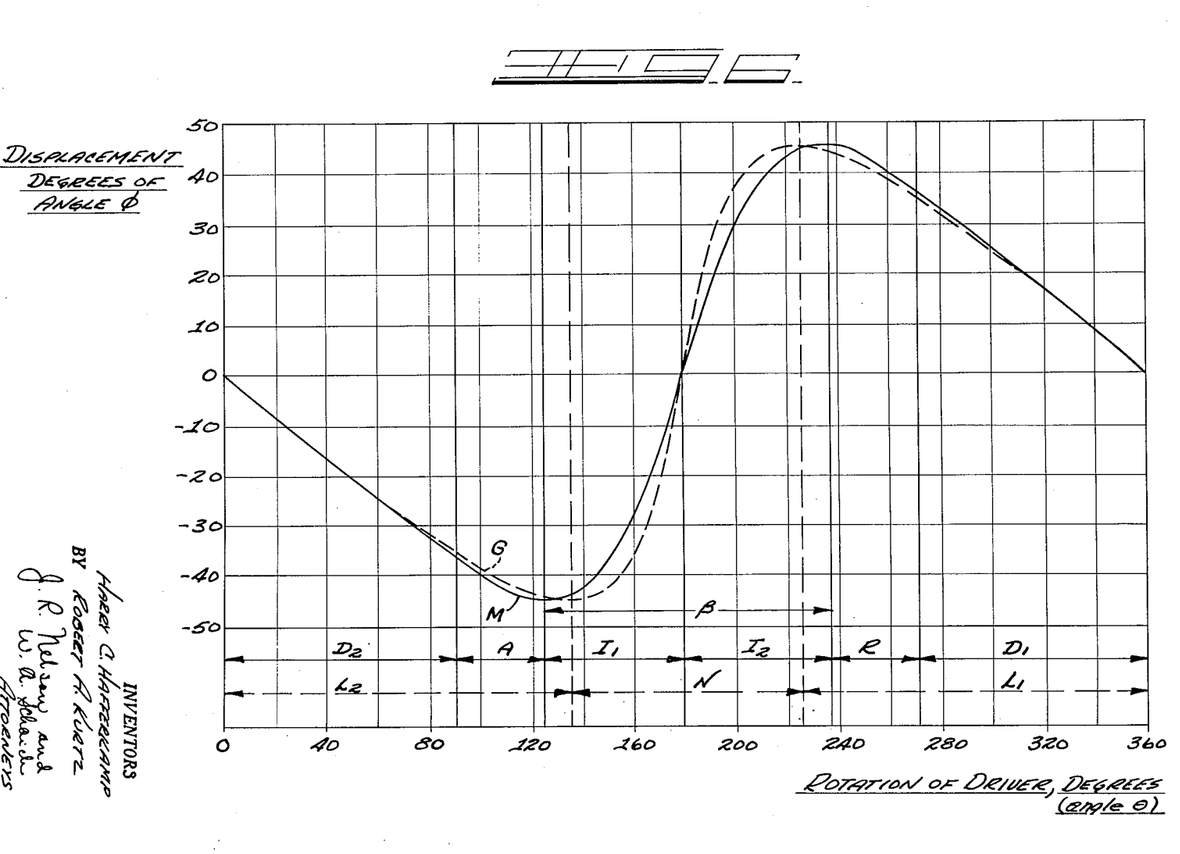
FIG. 5 is a detailed plan view showing the profile of the control cam for programming the driver.

Since one of the objects of the invention is to provide the drive unit such that it is operable in either direction of rotation, the curves M are symmetrical about the ordinate of 180° displacement (angle $\theta$) of the driver. Consequently, the cam contour illustrated herein is symmetrical on either side of the reference line 4—4 in FIGS. 3 and 5. The intervals of displacement marked on the graphs, FIGS 6–8, are similarly labeled on the cam 37, as shown on FIG. 5. In other words, the cam contour for periods $D_1$, A, $I_1$ is complementary and symmetrical with the cam contour for periods $D_2$, R, $I_2$ (FIG. 5).

It should be understood that the data herein disclosed for constructing cam 37 is but one specific example of the invention included solely for the purpose of demonstrating the manner of calculating a cam profile to provide a mechanical motion in accordance with the invention. This particular motion is demonstrated on the curves labeled M on FIGS. 6–8, drawn to scale for the particular data of this specific example. Therefore, in the calculations, the curves and formulae, hereinafter given, are for a construction of the invention wherein the distance between centers of shafts 17 and 28 is 4.2435 inches, the angle $\beta$ is 112°, the Geneva wheel 40 has four equally spaced slots 39, and the arm radius between centers of pin shaft 34 and shaft 28 is 3.125 inches when drive pin 38 is at 0° displacement or angle $\theta=0°$ at the beginning of the period $D_2$ (FIGS. 5–8). The invention is not intended to be limited in any manner by the foregoing numeral data. The distance between centers of 17 and 28 is, therefore, an independent variable capable of selection in the same sense as the number of slots or the diameter of the Geneva wheel may be selected. The same is true of the length of the arm radius between centers of shafts 34 and 28 when angle $\theta=0°$.

The cam contour in the various intervals of displacement of the drive pin 38 corresponding to one-half of the cam 37 will now be described by formulating angle $\phi$, defined earlier herein, in terms of angle $\theta$, the displacement of the drive pin 38.

From $\theta=0°$ to $\theta=90°$:

$$\phi = -\arc\sin\frac{3.125 \sin\theta}{\sqrt{27.7729173 + 26.521875 \cos\theta}}$$

From $\theta=90°$ to $\theta=91.2°$:

$$\phi = [-.00034204432\theta^3 + 0.093583325\theta^2 - 8.8852264\theta + 254.6272]$$

From $\theta=91.2°$ to $\theta=96.590279°$:

$$\phi = [-0.000143055370\theta^3 + 0.039139948\theta^2 - 3.91999080\theta + 103.68406]$$

From $\theta=96.590279°$ to $\theta=98.4°$:

$$\phi = [0.00042609238\theta^3 - 0.12578247\theta^2 + 12.0099120\theta - 409.20717]$$

From $\theta=98.4°$ to $\theta=102°$:

$$\phi = [0.00020825355\theta^3 - 0.061476449\theta^2 + 5.68219970\theta - 201.65821]$$

From $\theta=102°$ to $\theta=106°$:

$$\phi = [0.00022923846\theta^3 - 0.067897838\theta^2 + 6.33718250\theta - 223.92769]$$

From $\theta=106°$ to $\theta=118°$:

$$\phi = [0.00027777778\theta^3 - 0.083333333\theta^2 + 7.97334440\theta - 281.73874]$$

From $\theta=118°$ to $\theta=124°$:

$$\phi = [-0.00083333333\theta^3 + 0.31\theta^2 - 38.439990\theta + 1543.8524]$$

From $\theta=124°$ to $\theta=138°$:

$$\phi = 8.7521508\left[\frac{\theta-124}{28} - \frac{1}{\pi}\sin\left(\frac{45[\theta-124]}{7}\right)\right] - 45$$

From $\theta=138°$ to $\theta=166°$:

$$\phi = [0.01753552(\theta-124)^2 - 0.1784177(\theta-124) + 0.6510663] - 45$$

And, from $\theta=166°$ to $\theta=180°$:

$$\phi = 1.2945659(\theta-124) - 2.785896 \sin\left[\frac{45(\theta-124)}{7} - 180\right] - 72.495693$$

Either the rectangular or polar coordinates of the cam contour may be calculated as a trigonometric function of corresponding values of angles $\phi$ and $\theta$ obtained from the foregoing mathematical formulations.

It should be understood at this point that the approach period A as well as the recession period R may be extended to the maximum limits. The approach A may be extended up to a maximum period from $\theta=0°$ to the point whereat the drive pin 38 engages the slot of the driven wheel or the beginning of the index period $I_1$. Likewise, the recession R may be extended up to a maximum period from the point whereat the drive pin 38 disengages from the slot of the driven wheel, or the end of the index period $I_2$ to $\theta=360°$. Thus, the approach and recession paths of the drive pin may be varied to accomplish the basic objectives of the invention.

With reference to the herein disclosed example of the invention on curves on FIGS. 6–8, it should be noted the dotted curve G, representing a conventional Geneva drive, has a dwell period of the Geneva wheel indicated as $L_1 + L_2$, which is considerably longer than the dwell period on the curve M of the present invention, indicated as $(D_1+D_2+A+R)$. The two curves are illustrated on the basis of a 4-station Geneva wheel and it will be noticed, therefore, that the two displacement curves in FIG. 6 are quite similar except for the extension of the index period of the curve M beyond the index period of curve G. The index period for the curve G is labeled N on the graphs and is to be compared with the index period of $I_1+I_2$. This increase of indexing time is from 90° to 112°.

The velocity curves G and M on FIG. 7 are noticeably dissimilar. Comparison of these curves reveal two significant facts. First, the maximum velocity on the curve G is 49% higher than velocity for the curve M. Secondly, the slope of the curve M is zero at both the start and finish of the index period spanning $I_1+I_2$; whereas, the curve G at the same point at the beginning and end of the index period N has in each instance a considerable slope. This fact is magnified and reflected more clearly in the acceleration curves. Here the conventional Geneva drive, curve G, has a sizeable acceleration at start and finish of the index period N, which produces the shock in this mechanism. Furthermore, maximum rate of change of acceleration or the third derivative of displacement is infinite and therefore indicates excessive jerk, which theoretically, at least, represents infinite jerk. Also, part of this large discrepancy between the two curves is caused by the increase in the index period in the present invention so that this index period compared between the two curves, that is comparing N to $I_1+I_2$, is a ratio of 1:1.24. Since force is directly proportional to acceleration $(F=Ma)$, it can be seen that the drive unit of the present invention not only reduces shock, but also reduces the maximum forces involved. It does so by maintaining a moderate force for a relatively longer period of time; whereas, the conventional Geneva unit maintains a greater force for the shorter time. These facts summarize the essence of the invention.

While embodiments of the present invention have been herein specifically described, other embodiments and variations may occur to those skilled in the art after a knowledge of the disclosure herein, and it is desired to include within the scope of the patent granted hereon all such embodiments and variations, and more particularly as comprehended by the appended claims.

We claim:

1. An indexing-type drive comprising an output shaft, a slotted Geneva wheel connected to rotate said shaft, an input shaft mounted in spaced relationship with the axis of rotation of said Geneva wheel, means for rotating said input shaft at constant speed, a member attached to said input shaft for rotation with the latter, a driver engageable with the Geneva wheel and movable axially in its said slots, means shiftably connecting the driver for radial movement on said member and including a follower member, and annular guide means defining an endless path for engaging said follower member to control radial movement of the driver on said member, the center line of said path of the annular guide means at the point of engagement of said driver with one of said slots of the Geneva wheel corresponding with the longitudinal radial axis of said slot, and the driver being brought to the said slot so that at said point of engagement the driver has substantially zero velocity and acceleration transversely to said longitudinal axis of said slot, and said path of the annular guide means beyond said point of engagement being characterized by moving the driver to produce a finite rate of change of angular acceleration of said wheel substantially during its index.

2. The indexing-type drive defined in claim 1, further characterized by the fact that the center line of the path defined by the annular guide means at the point of disengagement of the driver with said one of the slots of the Geneva wheel corresponds with the longitudinal radial axis of said slot, and the driver at said point of disengagement has substantially zero velocity and acceleration transversely to said longitudinal axis of said slot.

3. A drive for indexing a rotatably mounted turret by a driven shaft, comprising a Geneva wheel operatively connected to rotate said driven shaft, a drive shaft mounted parallel with the axis of rotation of the Geneva wheel, power means for rotating the drive shaft at constant speed, a rotary member attached to the drive shaft to extend radially therefrom, said rotary member having a radial slideway thereon, a cooperating slide mounted in said slideway, a driver attached to said slide and adapted to engage the Geneva wheel at an elongated slot formed radially thereon and index the latter by rotation of the drive shaft, said driver, slide, slideway and rotary member providing a variable length rotary drive arm, a stationary cam having a cam surface defining an endless path around said drive shaft, and a cam follower attached to said slide and in running engagement with said cam surface so as to move said driver radially and vary the length of said drive arm in accordance with the cam surface, said cam being contoured to include at least three successive arcuate segments thereon, the first segment being of constant radius and defining a dwell period for the driver, the second segment having a variable radius and defining an approach period for the driver which terminates with engagement of the driver in the slot of the Geneva wheel, and a third segment of a variable radius corresponding over the span of movement during which the driver is in engagement with a Geneva wheel slot to index the latter a fraction of one revolution, said second cam segment guiding the driver into engagement with said Geneva wheel slot at a relative acceleration of zero transversely with respect to the centerline of the slot of said wheel, said third cam segment guiding said driver during its engagement in said slot of the Geneva wheel to produce a finite rate of change of acceleration of the latter during index, said second and third cam segments thereby guiding the movement of said driver in engagement with the Geneva wheel providing a minimum of jerk forces on the mechanism.

4. A drive for indexing a rotatably mounted turret by a driven shaft, comprising a Geneva wheel having plural, equally spaced slots, said wheel being operatively connected to rotate said driven shaft, a drive shaft mounted parallel with the axis of rotation of said Geneva wheel, means for rotating the drive shaft at constant speed, a member attached to the drive shaft to extend radially therefrom, said member having a radial slideway thereon, a cooperating slide member mounted in said slideway, a drive pin attached to said slide member and adapted to engage said Geneva wheel and index the latter by rotation of the drive shaft, said drive pin on said member providing a variable length rotary drive arm, a stationary cam member having a cam surface defining an endless path circumscribed about said drive shaft, and a cam roller in running engagement with said cam surface and attached to said slide member to move said drive pin radially and vary the length of the drive arm in accordance with the cam surface, said cam having a cam track formed with a contour thereon for guiding said drive pin to effect engagement of said pin in one of the slots of said Geneva wheel, said pin while engaged with said slot being guided through an angular displacement of the drive arm substantially greater than the angular displacement of said wheel during each index of the latter, said cam track contour being further characterized by guiding said drive pin to vary the radius of said arm to produce a relative velocity and acceleration of said pin transversely with respect to the centerline of said slot of zero instantaneously at the time of said engagement of it in said slot, and upon engagement said pin will drive said Geneva wheel for indexing movement at a finite rate of change of acceleration of the latter, thereby preventing application of jerk forces on the mechanism.

5. A drive for indexing a rotatably mounted turret by a driven shaft, comprising a plural slotted Geneva wheel operatively connected to rotate said shaft, a drive shaft mounted parallel with the axis of rotation of the Geneva wheel, means for rotating the drive shaft, a hub arm attached to the drive shaft to extend radially therefrom, said hub arm having a radial slideway thereon, a cooperating slide mounted in said slideway, a drive pin attached to said slide and adapted to engage the Geneva wheel in an elongated, radial slot thereof during rotation by the drive shaft and thereby index said wheel a fraction of one revolution, said drive pin and slide providing a variable length rotary drive arm, a stationary cam member having a cam surface defining a predetermined endless cam track, and a cam follower attached to said slide and engaging said cam surface, said pin being radially moved thereby to vary the length of said drive arm in accordance with said cam surface, the track surface of said cam extending through the angular displacement of the rotation of said rotary drive arm while said pin is in said slot, said cam surface being contoured for driving said pin in said slot through an angle of displacement of said arm that is at least 1.2 times greater than said fractional revolution of the index, said cam having a segment of its track surface contoured to guide said pin into engagement in a slot of said wheel at a zero velocity and acceleration of the pin transversely to the radial center of said slot at the instant of engagement, and an adjoining contiguous segment of its track surface contoured to guide said pin during indexing movement of the Geneva wheel in an acceleration of the Geneva wheel during index that defines a modified trapezoidal curve in plotting acceleration of said wheel against displacement of said pin during index.

6. A drive for indexing a rotatably mounted turret by a driven shaft, comprising a plural-slotted Geneva wheel operatively connected to rotate said shaft, a drive shaft mounted parallel with the axis of rotation of the Geneva wheel, means for rotating the drive shaft, a hub arm attached to the drive shaft to extend radially therefrom, said hub arm having a radial slideway thereon, a cooperating slide mounted in said slideway, a drive pin attached to said slide and adapted to engage the Geneva wheel in an elongated, radial slot thereof during rotation by the drive shaft and thereby index said wheel a fraction of one revolution, said drive pin and slide providing a variable length rotary drive arm, a stationary cam member having a cam surface defining a predetermined endless cam track, and a cam follower attached to said slide and engaging said cam surface, said pin being radially moved thereby to vary the length of said drive arm in accordance with said cam surface, the track surface of said cam extending through the angular displacement of the rotation of said rotary drive arm while said pin is in said slot, said cam surface being contoured for driving said pin engaged in said slot through an angle of displacement of said arm that is at least 1.2 times greater than said fractional revolution of index of said wheel, said cam having segments of its track surface that extend beyond either side of the angular displacement of said rotary drive arm for indexing said wheel, the first of said segments of the track surface being contoured to guide said pin radially in varying arm such that the pin enters a slot of said wheel in a direction parallel to the radial center of the slot and guides the pin into engagement with the slot at zero velocity and acceleration of the pin transversely to the radial center of said slot at the instant of engagement, and the second of said segments of the track surface being contoured to guide said pin radially in varying said drive arm such that the pin leaves the slot in a direction parallel to the radial center thereof and the pin has a zero relative velocity and acceleration transversely to the slot as it disengages the latter at the end of the index of said wheel, whereby shock forces on the mechanism are a minimum.

7. A drive for indexing a rotatably mounted turret by a driven shaft, comprising a plural-slotted Geneva wheel operatively connected to rotate said shaft, a drive shaft mounted parallel with the axis of rotation of the Geneva wheel, means for rotating the drive shaft, a hub arm attached to the drive shaft to extend radially therefrom, said hub arm having a radial slideway thereon, a cooperating slide mounted in said slideway, a drive pin attached to said slide and adapted to engage the Geneva wheel in an elongated, radial slot thereof during rotation by the drive shaft and thereby index said wheel a fraction of one revolution, said drive pin and slide providing a variable length rotary drive arm, a stationary cam member having a cam surface defining a predetermined endless cam track, and a cam follower attached to said slide and engaging said cam surface, said pin being radially moved thereby to vary the length of said drive arm in accordance with said cam surface, the track surface of said cam extending through the angular displacement of the rotation of said rotary drive arm while said pin is in said slot, said cam surface being contoured for driving said pin engaged in said slot through an angle of displacement of said arm that is at least 1.2 times greater than said fractional revolution of index of said wheel, said cam having a segment of its track surface contoured to guide said pin into engagement in a slot of said wheel at a zero velocity and acceleration of the pin transversely to the radial center of said slot at the instant of engagement, and an adjoining contiguous segment of its track surface contoured to guide said pin during indexing movement of the Geneva wheel in an acceleration of the Geneva wheel during index that defines a modified trapezoidal curve in plotting acceleration of said wheel against displacement of said pin during index, said acceleration increasing to a maximum in the first one-eighth of the indexing displacement, followed by a constant acceleration in the next one-fourth of said index, then a deceleration to a maximum thereof in the next one-fourth of said index, followed by a constant deceleration in the next one-fourth of said index, and the acceleration returning to zero at the end of said index.

8. The mechanism of claim 4, wherein said cam track is generated about the input shaft such that it is symmetrical on either side of center of the portion thereof for controlling the pin through its said movement for indexing said wheel, whereby the Geneva wheel may be indexed in like manner in either direction of rotation.

9. The mechanism of claim 4, wherein the angular displacement of the drive arm in relation to the angular displacement of the driven Geneva wheel while the drive pin is engaged in a slot of said Geneva wheel for producing an index thereof through an increment of one slot is a ratio of at least 1.2 to 1.

References Cited by the Examiner

UNITED STATES PATENTS

| | | | |
|---|---|---|---|
| 2,169,567 | 8/1939 | May | 74—436 |
| 3,106,109 | 10/1963 | Dexter | 74—822 |

OTHER REFERENCES

"Modified Geneva Drives and Special Mechanisms," by Sigmund Rappaport. Product Engineering, February 1953, pages 174–175.

MILTON KAUFMAN, *Primary Examiner.*

BROUGHTON G. DURHAM, *Examiner.*